United States Patent [19]
Johnson

[11] Patent Number: 4,659,135
[45] Date of Patent: Apr. 21, 1987

[54] ADJUSTABLE ARM REST
[75] Inventor: LeRoy B. Johnson, Perry, Mich.
[73] Assignee: Schmelzer Corporation, Flint, Mich.
[21] Appl. No.: 572,660
[22] Filed: Jan. 20, 1984
[51] Int. Cl.$^4$ ............................. A47C 7/54; B60N 3/00
[52] U.S. Cl. .................................... 296/453; 297/411; 74/535
[58] Field of Search ................ 296/153; 297/412, 411; 248/118; 74/535, 578, 577 R, 577 S; 400/313, 315, 316, 318, 332.1, 332.2, 332.3, 332.4, 332.5, 334.2, 334.3

[56] References Cited
U.S. PATENT DOCUMENTS

| 1,369,066 | 2/1921 | Waldheim | 400/315 |
|---|---|---|---|
| 1,742,447 | 1/1930 | McKeag | 296/153 |
| 1,892,048 | 12/1932 | Genung | 297/412 |
| 1,970,816 | 8/1934 | Perky | 155/198 |
| 2,325,292 | 7/1943 | Westrope | 296/153 X |
| 2,837,931 | 6/1958 | Brundage | 74/424.8 |
| 2,897,000 | 7/1959 | Hart et al. | 296/153 |
| 3,038,757 | 6/1962 | Schulze | 296/153 |
| 3,637,253 | 1/1972 | Maule et al. | 296/65 R |
| 3,642,088 | 2/1972 | Smith | 180/77 S |
| 4,097,088 | 6/1978 | Meiller | 297/217 |
| 4,244,623 | 1/1981 | Hall et al. | 297/411 |
| 4,311,338 | 1/1982 | Moorhouse | 297/411 |
| 4,496,190 | 1/1985 | Barley | 297/411 |
| 4,557,455 | 12/1985 | Benjamin | 248/496 |

FOREIGN PATENT DOCUMENTS

| 559424 | 10/1957 | Belgium . | |
| 2318176 | 10/1974 | Fed. Rep. of Germany . | |
| 2807023 | 8/1978 | Fed. Rep. of Germany | 296/153 |
| 1016138 | 11/1952 | France . | |
| 57-60931 | 4/1982 | Japan . | |
| 8101203 | 3/1981 | Netherlands . | |

Primary Examiner—Robert B. Reeves
Assistant Examiner—Russell D. Stormer
Attorney, Agent, or Firm—Harness, Dickey & Pierce

[57] ABSTRACT

An adjustable arm rest for a vehicle in which the arm rest is supported for both vertical and angular adjustment by means of rack and pawl mechanisms. Adjustment is achieved by moving the arm rest upwardly in increments to selected positions. The arm rest can be returned to its initial lower position by first moving the arm rest to its full upper position after which it is free to return to its lowest position by way of release elements which permit or prevent operation of the rack and pawl mechanism.

32 Claims, 8 Drawing Figures

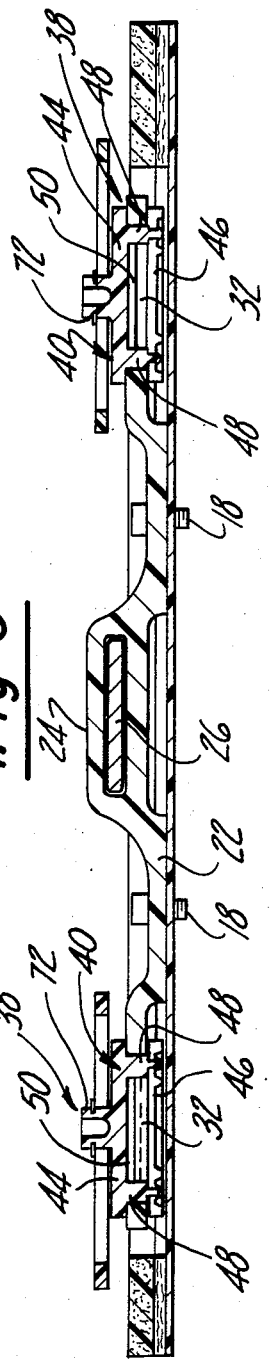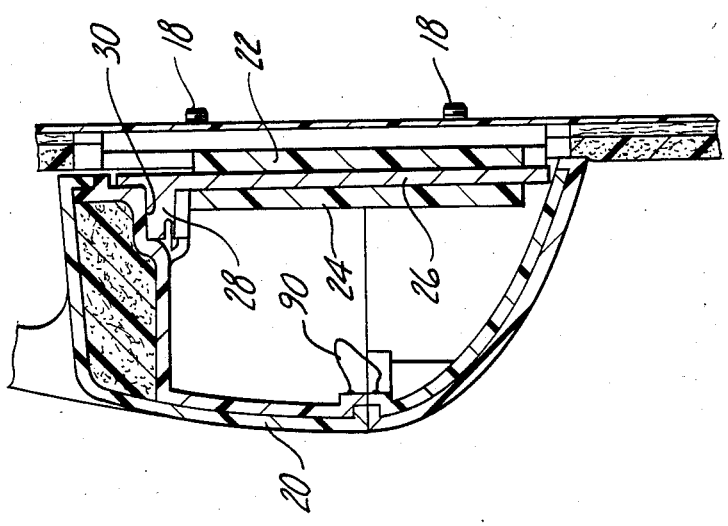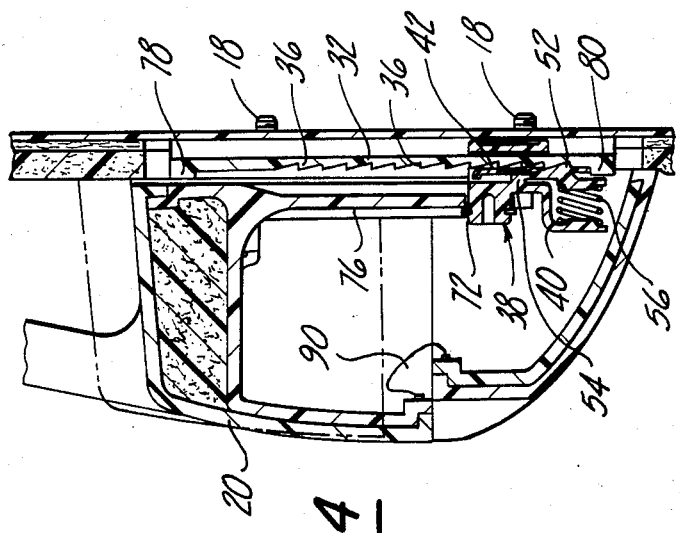

ADJUSTABLE ARM REST

BACKGROUND AND SUMMARY OF THE INVENTION

This invention relates to vehicle bodies and more particularly to adjustable arm rests for vehicle bodies.

This invention contemplates an arm rest assembly for a seat to be supported from a support structure at one side of the seat in which the arm rest structure is movable for both vertical translational adjustment and vertical angular adjustment to selected positions relative to the seat. The support and adjusting mechanisms include rack and pawl mechanisms, in which substantially verticaly disposed rack members are engaged by pawl members connected to the arm rest. The pawl members are movable independently upwardly relative to the respective associated rack members to permit incremental movement of the arm rest structure to selected positions. Downward movement is prevented, however, unless the arm rest is moved to its maximum vertical position, at the respective associated rack members, after which the arm rest structure can be returned to a starting position, where the pawl members reengage the rack members for subsequent vertical incremental adjustment. A pair of spaced rack and pawl mechanisms is employed to obtain incremental angular adjustment as well as vertical translational adjustment. Downwardly imposed loads due to pressure of a user's arm on the arm rest structure are absorbed primarily by a support bracket arrangement, which permits pivoting of the arm rest and vertical adjustment without transmitting any substantial portion of the loads on the arm rest to the adjusting mechanisms.

Additional objects, advantages and features of the present invention will become apparent from the following description and appended claims, taken in conjunction with the accompanying drawings.

BRIEF DESCRIPTION OF THE DRAWINGS

FIG. 3 is a cross-sectional view taken generally along line 3—3 of FIG. 2;

FIG. 4 is a cross-sectional view taken generally along line 4—4 of FIG. 2;

FIG. 5 is a cross-sectional view taken generally along line 5—5 of FIG. 2;

DETAILED DESCRIPTION OF THE PREFERRED EMBODIMENTS

Figure 1:
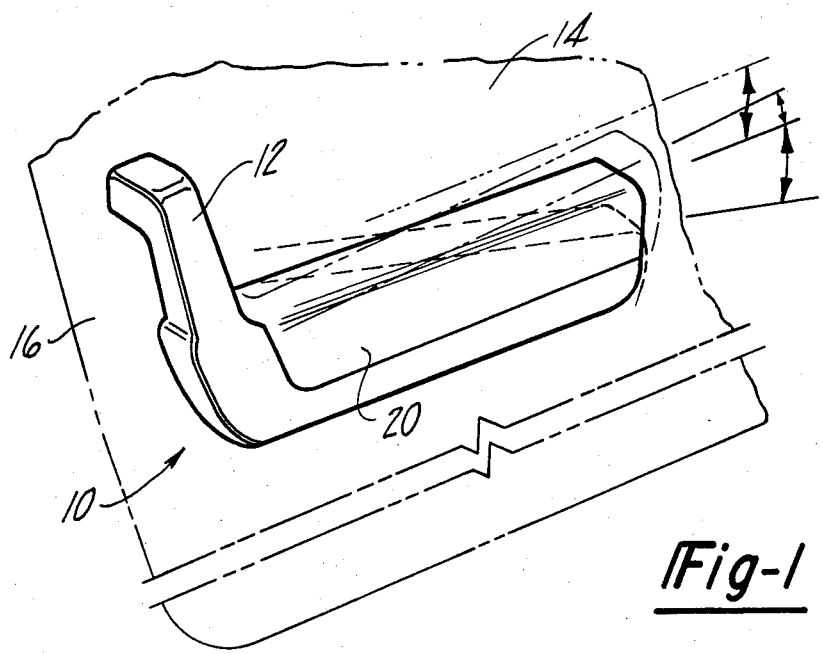
FIG. 1 is a perspective view of an arm rest assembly embodying the invention mounted on the interior wall of a door at the right side of a vehicle.

The arm rest assembly embodying the invention is designated generally at reference numeral 10 and includes a door pull structure 12, which is mounted in a fixed position relative to an interior wall 14 of a vehicle door 16. An adjustable arm rest 20 is supported in position for movement to selected elevations relative to the door pull 12 and for movement to selected positions of angular adjustment in a plane substantially parallel to the interior wall 14 of the vehicle door 16.

Figure 2:
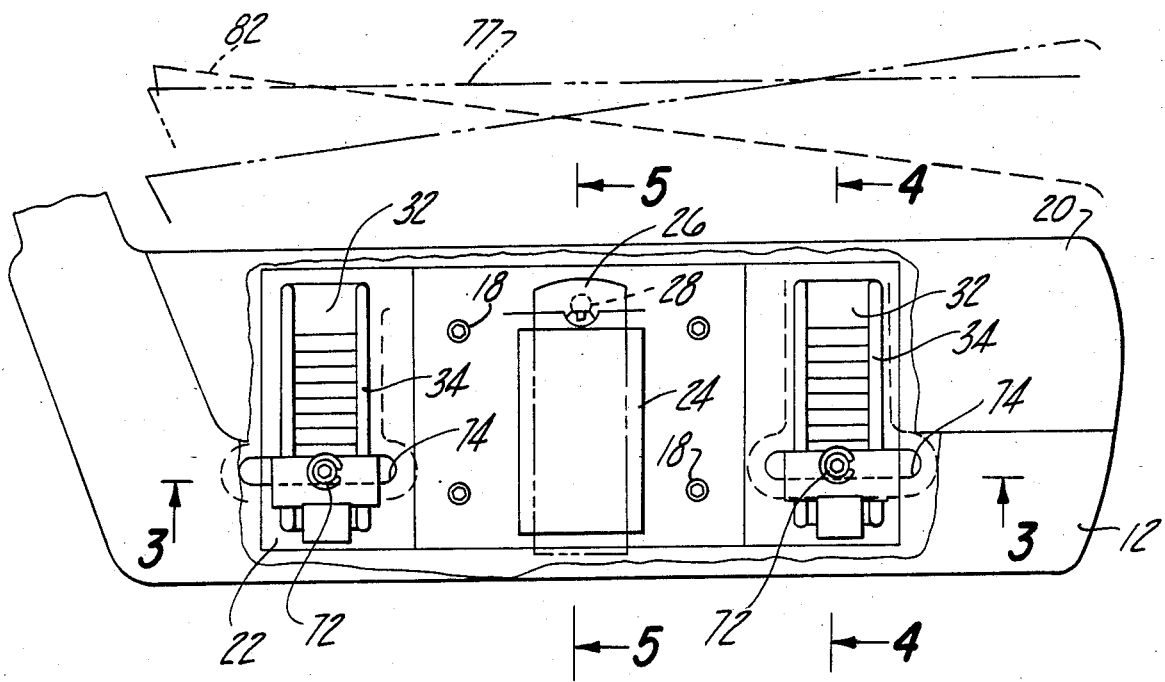
FIG. 2 is an elevational view, with parts broken away, showing the supporting and adjusting mechanisms of the arm rest assembly of FIG. 1.
Figure 7:
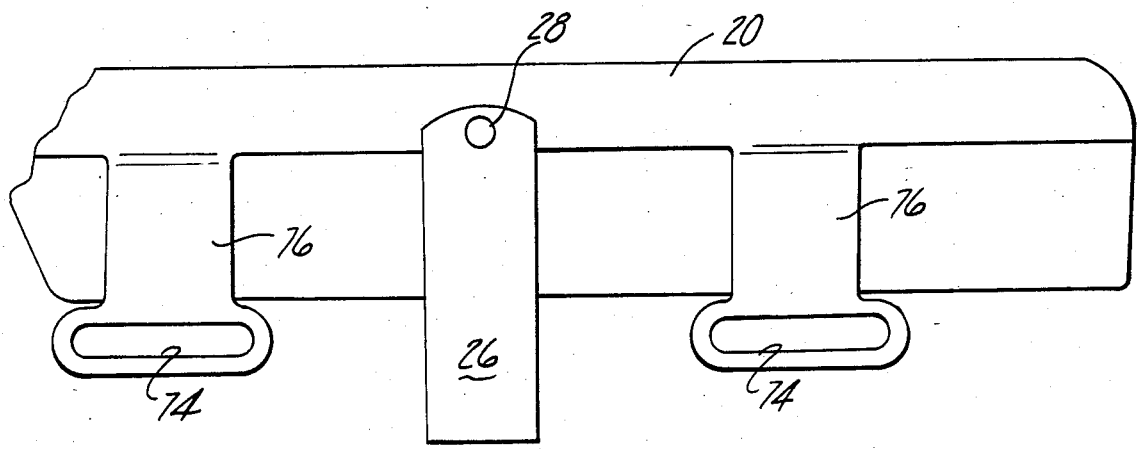
FIG. 7 is a view of a portion of the arm rest assembly with the adjusting mechanism removed.

The longitudinally-extending arm rest 20 is supported relative to the vehicle door 16 by a mounting member 22 which has a generally rectangular configuration when viewed as shown in FIG. 2 and is mounted on the door 16 by fasteners 18. The central portion of the mounting member 22 is formed with a vertically extending, and laterally outwardly-protruding, socket opening, 24 which is adapted to slidably receive a preferably metal support member 26. A pivot pin 28 is integrally formed on, for fixedly attached to, the upper end of the support member 26, as shown in FIGS. 2, 5 and 7, and is received in a pivot socket 30 formed in the arm rest 20. Structural parts of the bracket member 22 and the arm rest 20 are preferably molded of a plastic material, but the support member 26 is preferably made of metal. The support member 26 slides in the socket opening 24 and supports the arm rest 20, which projects outwardly from the vehicle door 16 with the support member 26 and particularly the socket opening 24 being closely adjacent to the interior wall 24 of the vehicle door 16.

As shown in FIGS. 2 through 4, the mounting member 22 includes a pair of rack elements 32 which are preferably formed integrally with the mounting member 22 at equally spaced distances from the socket opening 24. The upper and lower ends of the rack elements 32 are attached to the remainder of the mounting member 22, and slots 34 are formed in the mounting member 22 on opposite sides of the rack elements 32. The rack elements 32 each include uniformly spaced, and vertically inclined, teeth 36 which extend laterally into the outer face of the rack elements 32.

Figure 6:
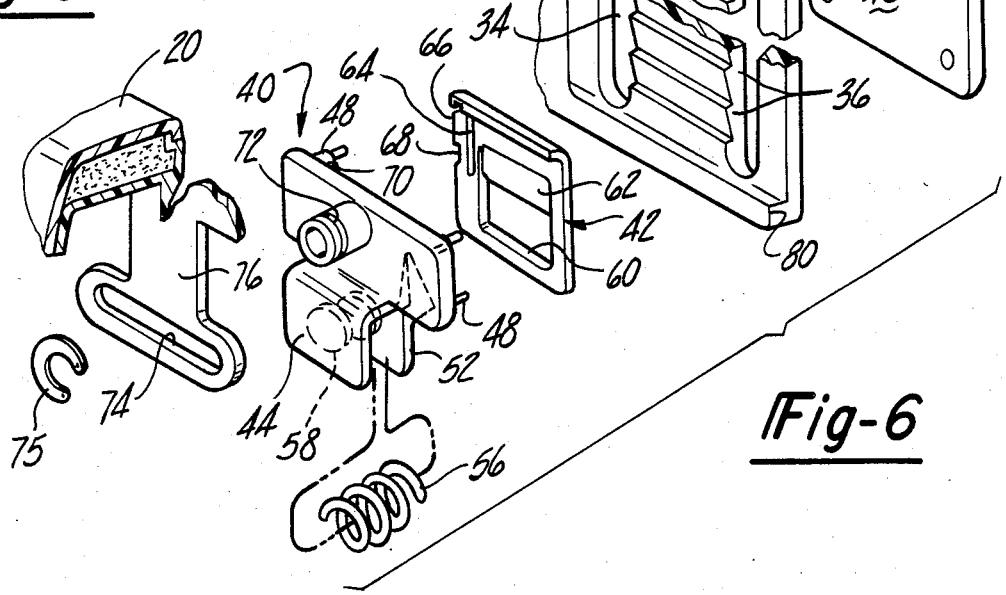
FIG. 6 is an exploded view of a portion of the adjusting mechanism of FIG. 4.

As shown in FIGS. 3, 4 and 6, each of the rack elements 32 slidably receive a pawl and lock mechanism 38, which includes a pawl member assembly 40 and a trip member 42. Each pawl member assembly 40 includes a socket portion 44 and legs 48 with the legs 48 being positioned to pass through the slots 34 and engage a backing plate 46 to form a recess 50, shown in FIG. 3, which receives one of the rack elements 32. The member socket portion 44 is formed with a pawl element 52, which flexes around a hinge portion 54 shown in FIG. 4. The pawl element 52 is resiliently urged into engagement with teeth 36 on the rack element 32 due to the natural resiliency of the preferred plastic material from which the socket portion 44 is made, and also by a compression spring 56 which acts between a spring seat 58 on the socket portion 44 and the pawl element 52. This arrangement makes it possible to move the pawl assembly 40 upwardly relative to its associated rack element 32 since the pawl element 52 will ratchet or deflectably slide as it passes over each of the teeth. However, downward movement of the pawl assembly 40 is prevented when the pawl element 52 is engaged with any one of the teeth 36.

A release or trip member 42 forms part of each pawl and lock mechansim 38 and is supported for movement relative to the pawl assembly 40. The trip member 42 is generally rectangular and plate-shaped, having a width equal to that of the rack element 32. The trip member 42 has an opening 60 and a shelf portion 62 adjacent to the opening 60. When the opening 60 is in alignment with the pawl element 52, as seen in FIG. 2, the pawl element 52 is free to engage the teeth 36. However, the trip element 42 is movable relative to the pawl assembly 40 to position the shelf portion 62 between the pawl element 52 and the teeth 36 so they are not permitted to engage with each other. With the shelf portion 62 between the pawl element 52 and the teeth 36, the associated pawl and lock mechanism 38 is free to move to either direction vertically relative to the rack element 32. When the opening 60 is aligned with the pawl element 52, however, the pawl and lock mechanism 38 can be moved only upwardly relative to the rack elements 32 because of the ratchet-type engagement of the pawl element 52 and the teeth 36.

As seen in FIG. 6, the trip member 42 includes an elongated opening 64 adjacent one side. The trip member 42 is preferably made of a plastic material, and the elongated opening 64 allows the portion 66 to resiliently deflect upon movement relative to the pawl assembly 40. The trip member 42 also is provided with a recess 68 adjacent the elongated opening 64 for receiving a lug 70 formed on one of the legs 48 of the pawl assembly 40, as best seen in FIG. 6. When the lug 70 is positioned in the recess 68, the opening 60 in the trip member 42 is in alignment with the pawl element 52 to permit engagement of the pawl element 52 with teeth 36, and to permit the above-discussed ratcheting movement of each pawl and lock mechanism 38, independently of each other, in an upward direction only.

The pawl assembly 40 is provided with a pivot member 72, which fits in a slot 74 formed in a wall 76, which is in turn formed in a part of the arm rest 20. The pivot members 72 are each received in a slot 74, and retained by a snap ring 75, and form the connection between the pawl and lock assembly 38 and the arm rest 20, such that the pawl and lock mechanisms 38 can move with the arm rest 20 during adjustment.

The operation of the adjustable arm rest assembly 10 is best understood by reference to FIGS. 2 and 4, in which the arm rest 20 is located at its lowermost position in engagement with the door pull structure 12. In this position of the arm rest 20, the pawl elements 52 are in alignment with the openings 60 in the trip members 42, so that the pawl elements 52 are in engagement with the teeth 36 on their respective rack elements 32. Upward movement of the arm rest 20 results in the support member 26 sliding upwardly in the socket 30, and in the pawl elements 52 slidably ratcheting over the teeth elements 36 of their respective rack elements 32. The arm rest 20 can be translated upwardly and vertically while maintaining a horizontal position, or it can be pivoted about the pivot pin 28, with the pawl and lock mechanisms operating independently of each other, to change the angular attitude of the arm rest 20. When the arm rest 20 is stopped at any of a number of selected elevated positions, each of the pawl 52 interferingly engage one of the teeth 36 and prevents downward movement of the arm rest 20 at the associated rack element 32. Further upward movement from any of the selected elevated positions can be achieved by moving the arm rest 20 upwardly to the end of its path of movement at either or both of the rack elements 32.

When the arm rest 20 approaches its upper limit, as indicated in broken lines at reference numeral 77 in FIG. 2, each trip members 42 engage an abutment 78 at the upper end of each rack element 32. Slight additional upward movement of the arm rest 20 causes the trip members 42 to move downwardly relative to pawl members 40 to move the shelf portions 62 between the pawl elements 52 and the teeth 36 so that the arm rest 20 can then be moved downwardly to its bottom or starting position. As the trip members 42 approach the lower ends of the rack elements 32, they engage abutments 80 at the bottom of each rack 32. Such abutting engagement causes the trip members 42 to move upwardly relative to pawl assemblies 40 to again position the openings 60 in the trip members 42 into alignment with the respective pawl elements 52, so that the pawl elements 52 can engage the teeth 32. The arm rest 20 is then again in condition for upward movement to selected elevated vertical positions and to selected angular positions, as discussed below.

It is possible to move opposite ends of the arm rest 20 independently of each other in order to achieve an angular orientation that is comfortable for the user. For example, the right end of the arm rest 20, as viewed in FIG. 2, may remain in its lowest position while the left end of the arm rest 20 is moved to its extreme upper limit. During such movement, the pivot members 72 slide horizontally to the right end of the slots 74, while the arm rest 20 pivots about its pin 28. As a practical matter, the arm rest 20 can be adjusted by moving both ends simultaneously, or one end at a time, to achieve the desired elevation and angular attitude.

As discussed above, the forward or left-hand end of the arm rest 20, as viewed in FIG. 2, can be adjusted upwardly by lifting on the forward of left-hand end of the arm rest 20. This causes simultaneous pivotal movement of the arm rest 20 relative to the support member 26 and upward vertical movement of the support member 26 in its socket opening 24. At the same time, the pivot members 72 move to the right in their associated slots 74. Similarly, lifting the opposite or right-hand end of the arm rest member 20, as viewed in FIG. 2, causes similar movements except that the pivot members 72 move leftwardly in the slots 74. During such adjusting movement, the changes in positions of the arm rest 20 are accomplished incrementally, and the sliding movement of the pawl elements 52, as they slidably ratchet over the rack elements 32, is audible in order to make the user aware that adjustments are being accomplished.

As the arm rest 20 reaches its upper range of adjustment, at each rack element 32, additional force is required to move the arm rest 20 upwardly to achieve the unlocked or released position which positions the shelf portions 62 of the trip members 42 into alignment with the pawl elements 52. This is due to the force required to deflect the outer portions 66 on the trip members 42, as the lugs 70 move out of their respective recesses 68. This feature prevents accidental release or unlatching of the pawl and lock mechanisms 38 by making the user cognizant that the arm rest has been moved to the upper end of its range movement, and that by use of additional force, the arm rest 20 can be returned to its bottom or starting position at each of the rack elements 32.

Figure 8:
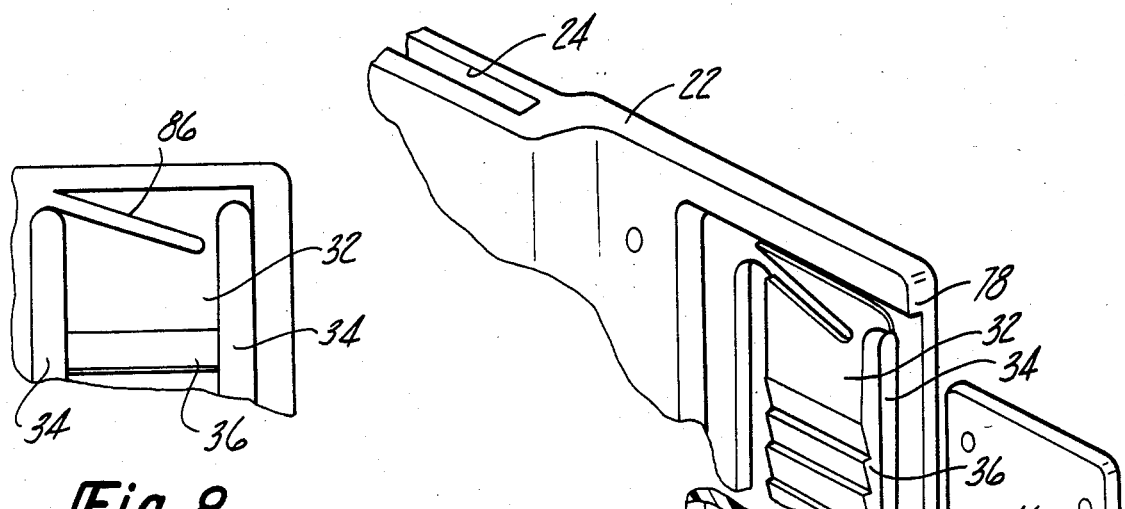
FIG. 8 is an alternative arrangement which can optionally be used in the adjusting mechanism of FIGS. 2 through 7.

An additional feature for protecting against unintentional release or unlatching of the pawl and lock assemblies 38 is illustrated in FIG. 8. A cantilever spring element 86 is formed at the upper end of each rack element 32. The trip member 42 must deflect the spring element 86, which requires additional upward force, in order for the lug 70 to become seated in the recess 68, in which position the trip member 42 is released.

In all positions of adjustment, the arm rest 20 is supported by the mounting member 22 and the adjusting mechanisms, namely the rack elements 32 and the pawl and lock assemblies 38, are not required to sustain any large amount of the arm-supporting loads.

The above-described mechanisms for supporting and adjusting the arm rest 20 relative to the door pull structure 12, are protected and concealed by the nesting of the door pull structure 12 and arm rest 20, as shown in FIGS. 4 and 5. A folding leather or vinyl boot 90 can also be attached at its opposite edges to the arm rest 20 and the door pull structure 12 to conceal the mechanisms in all positions of adjustment.

The foregoing discussion discloses and describes exemplary embodiments of the present invention. One skilled in the art will readily recognize from such discussion that various changes, modifications and variations can be made therein without departing from the spirit and scope of the invention as defined in the following claims.

I claim:

1. In an arm rest assembly adapted to be positioned generally adjacent a seat comprising: a support structure in a vertically fixed relationship at one side of said seat, an elongated and movable arm rest structure, and adjustment means for supporting said arm rest structure on said support structure and for vertically adjusting said arm rest structure to selected positions relative to said seat, said adjustment means including a rack and pawl mechanism, said rack and pawl mechanism having an elongated rack member disposed substantially vertically relative to said seat and connected to one said support and arm rest structures, and pawl member connected to the other of said support and arm rest structures, said pawl member being selectively engageable with said rack member to permit selective incremental movement of said arm rest structure upwardly to said selected positions and to selectively prevent movement of said arm rest structure downwardly relative to said seat, a trip member slidably interconnected with said pawl member for limited movement relative thereto between a first position allowing said engagement between said pawl member and said rack member and a second position between said pawl member and said rack member disengaging said pawl member therefrom, first abutment means abuttingly engageable with said trip element to urge said trip member into said first position disengaging said pawl member from said rack member in response to relative movement of said rack and pawl members from a selected arm rest structure position to the maximum upward arm rest structure position whereby said arm rest structure is movable downwardly to the maximum downward arm rest structure position, and second abutment means abuttingly engageable with said trip member to urge said trip element into said second position reengaging said pawl member with said rack member to permit return selective incremental movement of said arm rest structure in a vertically upward direction to a selected arm rest structure position relative to said support structure.

2. The arm rest assembly of claim 1, wherein said rack member is connected to said support structure and said pawl member is connected to said movable arm rest structure.

3. The arm rest assembly of claim 1, wherein said adjustment means for supporting said arm rest structure for vertical adjustment includes a second rack and pawl mechanism connected to said support and arm rest structures in spaced longitudinal relationship to said first mentioned rack and pawl mechanism.

4. The arm rest assembly of claim 3, wherein said rack and pawl members of each said rack and pawl mechanisms are movable independently of each other, whereby said arm rest structure is adjustable vertically to selected vertical and angular positions relative to said support structure.

5. The arm rest assembly of claim 4, wherein said arm rest structure is movable to selected positions between a generally horizontal position and a maximum angular position in which one of said rack and pawl mechanisms is at the bottom of its range of adjustable relative movement and the other rack and pawl mechanism is at the top of its range of adjustable relative movement.

6. The arm rest assembly of claim 4, wherein said rack members are connected to said support structure and said pawl members are connected to said arm rest structure, said adjustment means further including a pair of horizontal slots formed in said arm rest structure, and a pin carried by each of said pawl members, each of said pins being slidable in one of said slots during angular movement of said arm rest structure relative to said support structure.

7. The arm rest assembly of claim 1, further comprising guide means for guidingly supporting said arm rest structure for movement in a vertical path fixed transversely relative to said seat adjacent which said arm rest structure is adapted to be positioned.

8. The arm rest assembly of claim 7, wherein said arm rest structure is pivotally attached to said guide means for vertical angular movement about an axis extending generally horizontally and transversely relative to said arm rest structure.

9. The arm rest assembly of claim 7, wherein said guide means includes a socket opening formed in said support member and a support member slidably received in said socket opening, said arm rest structure being pivotally attached to said support member.

10. The arm rest assembly of claim 9, wherein said rack member is formed in said support structure.

11. The arm rest assembly of claim 10, wherein said socket opening and said rack member extend substantially vertically in substantially the same vertical plane.

12. The arm rest assembly of claim 3, wherein said rack and pawl mechanisms are spaced apart from each other and spaced away from opposite ends of said elongated arm rest structure, whereby downward pressure on one end of said arm rest structure urges the other end of said arm rest structure upwardly.

13. The adjustable arm rest assembly of claim 1, wherein said pawl member includes a socket portion fixed to one of said structures and a pawl element portion flexibly supported relative to said socket portion and normally urged into engagement with said rack member during movement of said arm rest structure upwardly.

14. The arm rest assembly of claim 13, wherein said socket portion and said pawl element porition are formed integrally with each other of a plastic material and a spring element is disposed between said socket portion and said pawl element portion to continuously urge said pawl element portion towards said rack member.

15. The adjustable arm rest assembly of claim 13, further comprising flexible means disposed between said arm rest structure and door pull structure for concealing said pair of adjustable support means for the full range of movement of said arm rest structure.

16. The arm rest assembly of claim 1, wherein said support structure and said arm rest structure conceal said rack and pawl members for the full range of movement of said arm rest structure relative to said support structure.

17. The arm rest assembly of claim 1, wherein said rack member includes a plurality of uniformly and closely spaced teeth, and wherein said pawl member includes a resiliently deflectable pawl element portion resiliently urged into engagement with said teeth to cause an audible sound as said pawl element portion deflects relative to said teeth during upward incremental movement of said arm rest structure.

18. An adjustable arm rest assembly for a motor vehicle body comprising: an elongated generally horizontally extending arm rest structure, a pair of adjustable support means for adjustably supporting said arm rest structure relative to said body for both vertical and angular adjustment relative thereto, said pair of adjustable support means being disposed in longitudinally spaced relation relative to one another in association with said arm rest structure, each of said adjustable support means including a vertically extending rack member interconnected with said vehicle body and a pawl member interconnected with said arm rest structure, each of said pair of pawl members being engageable with an associated one of said pair of rack members, respectively, to permit selective independent and incremental relative movement of each of said pawl members upwardly relative to its associated rack member and to selectively prevent movement downwardly, means associated with each of said adjustable support means for disengaging each of said pawl members from its associated rack member when said pawl member is moved vertically upward to a maximum upward vertical position relative to its associated rack member, after which said arm rest structure is movable downwardly to the bottom of its path relative to said rack members, and means associated with each of said adjustable support means for reengaging said pawl members with said associated rack members to permit return incremental movement of said arm rest structure in a vertically upward direction to a selected position relative to said vehicle body.

19. The adjustable arm rest assembly of claim 18, wherein said arm rest structure is supported relative to a door of said motor vehicle body, said arm rest assembly further comprising a door pull structure fixed to said door, said arm rest structure and door pull structure being in abutting relationship to each other when said arm rest structure is at the bottom of its range of adjustment.

20. An adjustable arm rest assembly adapted to be installed on a generally vertical structure, said arm rest assembly comprising:
a generally longitudinally-extending arm rest structure;
mounting means adapted to be fixedly secured to said vertical structure for mounting said arm rest structure on one side thereof, said mounting means including a socket opening extending generally vertically therethrough, and being laterally spaced apart from said vertical structure in a direction generally toward said arm rest structure;
support means for interconnecting said arm rest structure with said mounting means for both pivotal and generally vertical adjustable movement relative to said mounting means in a generally vertical plane, said support means including a generally vertically elongated support member slidably received for generally vertical movement in said socket opening, said arm rest structure being pivotally interconnected with said support member for said generally vertical movement therewith;
a pair of holding means longitudinally spaced apart on opposite sides of said support means interconnecting said arm rest structure and said mounting means for selectively holding said arm rest structure in any of a number of adjusted positions relative to said mounting means and for substantially preventing generally downward movement of said arm rest structure relative to said mounting means, said holding means being operable substantially independently of one another to perform said holding and said preventing functions, each said holding means including a ratchet mechanism having a generally vertical elongated rack member on one of said arm rest structure and said mounting means and a pawl member on the other of said arm rest structure and said mounting means, said rack member having a plurality of ratchet teeth serially arranged in a generally vertical path, said pawl member being slidably and serially engageable with said ratchet teeth in order to allow incremental upward movement of said arm rest structure relative to said mounting means independently at each of said ratchet mechanisms; and
release means operatively associated with each of said holding means for selectively releasing the associated holding means in order to allow said downward movement of said arm rest structure relative to said mounting means and to allow said arm rest structure to be moved to any other of said adjusted positions, said release means being operable independently of one another in order to selectively release said holding means independently of one another, with each of said release means including means for disengaging said pawl member from said teeth of its associated ratchet mechanism in response to selective movement of said arm rest structure to a maximum upward vertical position at said associated ratchet mechanism, said arm rest structure then being movable downwardly relative to said mounting means at said associated ratchet mechanism, and each said release means further including means for reengaging said pawl member with the teeth of its associated ratchet mechanism in response to selective movement of said arm rest structure to a maximum downward vertical position, said arm rest structure then being again incrementally movable upwardly relative to said mounting means at said associated ratchet mechanism,
said arm rest structure thereby selectively adjustable in said generally vertical plane to any of a number of pivotal and vertical positions relative to said vertical structure.

21. An adjustable arm rest assembly according to claim 20, wherein each of said release means includes a trip member interconnected with said pawl member of its associated ratchet mechanism for limited movement relative thereto between a first position allowing said engagement between said pawl member and said teeth of its associated ratchet mechanism and a second position between said pawl member and said teeth preventing said engagement therebetween, said arm rest structure being movable downwardly relative to said mounting means at said associated ratchet mechanism when said trip member is in said second position.

22. An adjustable arm rest assembly according to claim 21, wherein each of said release means further includes an abutment member fixed relative to an upper end of said rack member of its associated ratchet mechanism, said trip element being abuttingly engageable with said abutment member when said arm rest structure is moved relative to said mounting means to its maximum upward position at said associated ratchet mechanism, said abutting engagement with said abutment member urging said trip element into said second position in order to allow said arm rest structure to be moved downwardly relative to said mounting means at said associated ratchet mechanism, and a second abutment member fixed relative to a lower opposite end of said rack member of its associated ratchet mechanism, said trip element member being abuttingly engageable with said second abutment when said arm rest structure is moved relative to said mounting means to its maximum downward position at said associated ratchet mechanism, said abutting engagement with said second abutment member urging said trip element into said first position in order to allow said pawl member to engage said rack member and prevent said arm rest structure from being moved downwardly relative to said mounting means at said ratchet mechanism.

23. An adjustable arm rest assembly according to claim 20, wherein each said rack member is interconnected with said mounting means, and each said pawl member is interconnected with said arm rest structure.

24. An adjustable arm rest assembly according to claim 23, wherein each said pawl member is interconnected with said arm rest structure for limited longitudinally relative movement therebetween.

25. An adjustable arm rest assembly according to claim 20, wherein each said rack member is interconnected with said arm rest structure, and each said pawl member is interconnected with said mounting means.

26. An adjustable arm rest assembly adapted to be installed on a generally vertical structure, said arm rest assembly comprising:
a generally longitudinally-extending arm rest structure;
mounting means adapted to be fixedly secured to said vertical structure for mounting said arm rest structure on one side thereof;
support means for interconnecting said arm rest structure with said mounting means for both pivotal and generally vertical adjustable movement relative to said mounting means in a generally vertical plane;
a pair of holding means longitudinally spaced apart on opposite sides of said support means interconnecting said arm rest structure and said mounting means for selectively holding said arm rest structure in any of a number of adjusted positions relative to said mounting means and for substantially preventing generally downward movement of said arm rest structure relative to said mounting means, said holding means being operable substantially independently of one another to perform said holding and said preventing functions, said holding means each including a ratchet mechanism having a generally vertically elongated rack member on one of said arm rest structure and said mounting means and a pawl member on the other of said arm rest structure and said mounting means, said rack member having a plurality of ratchet teeth serially arranged in a generally vertical path, said pawl member being slidably and serially engageable with said ratchet teeth in order to allow incremental upward movement of said arm rest structure relative to said mounting means independently at each of said ratchet mechanisms, and
release means operatively associated with each of said holding means for selectively releasing the associated holding means in order to allow said downward movement of said arm rest structure relative to said mounting means and to allow said arm rest structure to be moved to any other of said adjusted positions, said release means being operable independently of one another in order to selectively release said holding means independently of one another, each of said release means including trip means for disengaging said pawl member from said teeth of its associated ratchet mechanism in response to selective movement of said arm rest structure to a maximum upward vertical position at said associated ratchet mechanism, said arm rest structure then being movable downwardly relative to said mounting means at said associated ratchet mechanism, and said trip means further including means for reengaging said pawl member with the teeth of its associated ratchet mechanism in response to selective movement of said arm rest structure to a maximum downward vertical position, said arm rest structure then being again incrementally movable upwardly relative to said mounting means at said associated ratchet mechanism, each of said trip means including a trip member interconnected with said pawl member of its associated ratchet mechanism for limited movement relative thereto between a first position allowing said engagement between said pawl member and said teeth of its associated ratchet mechanism and a second position between said pawl member and said teeth preventing said engagement therebetween, said arm rest structure being movable downwardly relative to said mounting means at said associated ratchet mechanism when said trip member is in said second position,
said arm rest structure thereby being selectively adjustable in said generally vertical plane to any of a number of pivotal and vertical positions relative to said vertical structure.

27. An adjustable arm rest assembly according to claim 26, wherein said mounting means includes a socket opening extending generally vertically therethrough, said support means including a generally vertically elongated support member slidably received for generally vertical movement in said socket opening, said arm rest structure being pivotally interconnected with said support member for said generally vertical movement therewith.

28. An adjustable arm rest assembly according to claim 27, wherein said socket opening is laterally spaced apart from said vertical structure in a direction generally toward said arm rest structure.

29. An adjustable arm rest assembly according to claim 26, wherein each of said release means further includes an abutment member fixed relative to an upper end of said rack member of its associated ratchet mechanism, said trip element being abuttingly engageable with said abutment member when said arm rest structure is moved relative to said mounting means to its maximum upward position at said associated ratchet mechanism, said abutting engagement with said abutment member urging said trip element into said second position in order to allow said arm rest structure to be moved downwardly relative to said mounting means at said associated ratchet mechanism, and a second abutment member fixed relative to a lower opposite end of said rack member of its associated ratchet mechanism, said trip element member being abuttingly engageable with said second abutment when said arm rest structure is moved relative to said mounting means to its maximum downward position at said associated ratchet mechanism, said abutting engagement with said second abutment member urging said trip element into said first position in order to allow said pawl member to engage said rack member and prevent said arm rest structure from being moved downwardly relative to said movement means at said ratchet mechanism.

30. An adjustable arm rest assembly according to claim 26, wherein each said rack member is interconnected with said mounting means, and each said pawl member is interconnected with said arm rest structure.

31. An adjustable arm rest assembly according to claim 30, wherein each said pawl member is interconnected with said arm rest structure for limited longitudinally relative movement therebetween.

32. An adjustable arm rest assembly according to claim 26, wherein each said rack member is interconnected with said arm rest structure, and each said pawl member is interconnected with said mounting means.

* * * * *

UNITED STATES PATENT AND TRADEMARK OFFICE
CERTIFICATE OF CORRECTION

PATENT NO. : 4,659,135

DATED : April 21, 1987

INVENTOR(S) : LeRoy B. Johnson

It is certified that error appears in the above-identified patent and that said Letters Patent is hereby corrected as shown below:

Column 3, line 5, "move to" should be -- move in --

Column 3, line 53, "elements" -- should be inserted after "pawl"

Column 4, line 26, "of left-hand" should be -- or left-hand --

Column 4, line 36, "positions" should be -- position --

Column 5, line 27, "one said" should be -- one of said --

Column 5, line 28, "and pawl" should be -- a pawl --

Column 5, line 67, "said" should be -- of said --

Column 6, line 55, "porition" should be -- portion --

Column 8, line 53, "thereby" should be -- thereby being --

Column 12, line 1 & 2, "movement" should be -- mounting --

Signed and Sealed this

First Day of December, 1987

*Attest:*

DONALD J. QUIGG

*Attesting Officer*  *Commissioner of Patents and Trademarks*